(12) United States Patent
Ellis

(10) Patent No.: US 10,582,733 B2
(45) Date of Patent: Mar. 10, 2020

(54) METHODS FOR PRODUCING GARMENTS AND GARMENT DESIGNS

(71) Applicant: Sharon Irla Ellis, Welling, OK (US)

(72) Inventor: Sharon Irla Ellis, Welling, OK (US)

(73) Assignee: IRLA INATURA DESIGN, LLC, Kosciusko, MI (US)

( * ) Notice: Subject to any disclaimer, the term of this patent is extended or adjusted under 35 U.S.C. 154(b) by 187 days.

(21) Appl. No.: 14/615,174

(22) Filed: Feb. 5, 2015

(65) Prior Publication Data

US 2016/0227854 A1     Aug. 11, 2016

(51) Int. Cl.
*A41H 3/00* (2006.01)
*A41D 27/08* (2006.01)
*G06T 3/00* (2006.01)
*G06T 15/04* (2011.01)

(52) U.S. Cl.
CPC ............. *A41D 27/08* (2013.01); *A41H 3/007* (2013.01); *G06T 3/005* (2013.01); *G06T 15/04* (2013.01); *G06T 2210/16* (2013.01); *G06T 2210/44* (2013.01); *G06T 2210/62* (2013.01)

(58) Field of Classification Search
CPC ........ A41D 27/08; A41H 3/0007; A41H 3/04; G06T 2210/16
USPC .................................................. 700/130–132
See application file for complete search history.

(56) References Cited

U.S. PATENT DOCUMENTS

| | | | |
|---|---|---|---|
| 1,817,053 A * | 8/1931 | Zerk ...................... | A41B 11/00 2/239 |
| D94,420 S | 1/1935 | Hayman | |
| D180,608 S | 7/1957 | Mansueto | |
| D181,419 S | 11/1957 | Mansueto | |
| 4,282,609 A * | 8/1981 | Freedman ............... | A41B 11/14 2/239 |
| D278,474 S | 4/1985 | Myles | |
| 4,576,904 A | 3/1986 | Anitole | |
| D358,928 S | 6/1995 | Slagle et al. | |
| 5,727,253 A * | 3/1998 | Wilkinson ................ | F41H 3/00 2/69 |
| 5,924,131 A * | 7/1999 | Wilkinson ................ | F41H 3/00 2/69 |
| 6,682,879 B2 | 1/2004 | Conk | |
| 6,912,440 B2 | 6/2005 | Tooley | |
| 7,107,621 B2 | 9/2006 | Meekins | |
| 8,181,274 B1 | 5/2012 | Prince et al. | |
| 8,420,206 B2 | 4/2013 | Bernegger et al. | |
| 8,731,703 B1 * | 5/2014 | Lehrer .................. | G06F 3/1257 700/132 |
| 9,406,172 B2 * | 8/2016 | Selvarajan ............. | A41H 3/007 |
| 9,542,069 B2 * | 1/2017 | Mulligan ............ | G06F 3/04815 |
| 2005/0276955 A1 | 12/2005 | Tooley | |
| 2005/0283880 A1 | 12/2005 | Lamson et al. | |
| 2014/0215682 A1 * | 8/2014 | Northup ............... | B41M 5/0256 2/69 |
| 2015/0066189 A1 * | 3/2015 | Mulligan ............ | G06F 3/04815 700/136 |

(Continued)

*Primary Examiner* — Nathan E Durham

(74) *Attorney, Agent, or Firm* — Armstrong Teasdale LLP

(57) ABSTRACT

The present disclosure is generally directed to methods for producing garments and garment designs. More particularly, disclosed are methods for producing figure-flattering garments and garment designs that create an optical illusion of an anatomical feature. The garment designs are created by manipulating a macro scale pattern from nature.

22 Claims, 18 Drawing Sheets

(16 of 18 Drawing Sheet(s) Filed in Color)

(56) References Cited

U.S. PATENT DOCUMENTS

2015/0208746 A1* 7/2015 Schindler ............... G06Q 10/06
　　　　　　　　　　　　　　　　　　　　　　　700/132
2015/0339800 A1* 11/2015 Selvarajan ............. A41H 3/007
　　　　　　　　　　　　　　　　　　　　　　　345/419

* cited by examiner 1702
1704

1802

METHODS FOR PRODUCING GARMENTS AND GARMENT DESIGNS

BACKGROUND OF THE DISCLOSURE

The present disclosure is generally directed to methods for producing garments and garment designs. More particularly, disclosed are methods for producing figure-flattering garments and garment designs that create an optical illusion of an anatomical feature. The garment designs are created by manipulating a macro scale pattern from nature.

In the clothing industry, it is often desirable to create garments that are figure-flattering. For instance, it may be desirable for the garment to emphasize or enhance certain features of the garment wearer's anatomy, while diminishing or deemphasizing other features. Figure-flattering garments are typically produced by creation and/or selection of a garment template (or style) having figure-flattering features. For example, a swimsuit template may call for an attached skirt to camouflage a wearer's lower abdomen and upper thighs, or may call for gathering of the fabric to emphasize the presence of the wearer's waist. Once a suitable figure-flattering template is created or selected, the garment is cut from a textile having a desired design thereon to produce the figure-flattering garment.

The purpose and function of designs on textiles and garments has evolved over time. The basis for a garment or textile design may come from numerous sources, including the texture, color, tone, and/or shape of an object, or from the imagination of the designer. For example, a garment designer could see a blue flower painted on a physical object and envision the flower's use on a dress, sweater, pants, or swim suit. In other instances, a garment or textile designer may create a design from shapes, lines, images, colors, tones, or texture of artwork that originates from the designer's imagination. However, while garment designs have been used for both ornamental and decorative purposes and to convey aesthetic appeal, they have not been used or manipulated to create the illusion of an anatomical feature of the garment's wearer, or to improve the figure-flattering nature of the garment.

For instance, in some garment production processes, a textile or fabric design is selected from mass-produced (pre-designed and printed) collections from textile manufacturers and the garment is cut from the selected textile or fabric. In these instances, the designs on the textile or fabric used to create the garment are not manipulated in order to create the illusion of an anatomical feature, and/or to enhance or deemphasize an anatomical feature of the garment's wearer.

Advances in computer generated textile printing and 3-D fashion design software have also allowed garment designers to apply their own, in-house designed graphic patterns to textiles and garments, rather than relying solely on textiles offered by manufacturers. However, designs created using in-house designed graphic patterns are typically imprinted on the selected fabric used to create the garment with minimal to no alteration to the design, and without manipulation of the design to create the illusion of an anatomical feature or to enhance or deemphasize an anatomical feature of the garment's wearer. While the design may be engineered to ensure precise arrangement on the printed fabric, e.g., to provide balance, symmetry, maximum cloth usage, and to match up patterns in the finished garment, placement of the design on the fabric typically includes application of the flat design pattern without any alterations or further manipulation.

Some garments use color blocking (i.e., positioning two colors adjacent to each other, where the two colors are opposite one another on a color wheel chart) to form a design on the garment comprising contrasting colors. However, while color blocking keeps a viewer's eye from focusing on one color section, it does not produce a design that creates the illusion of a body shape or form.

It would thus be advantageous to provide an improved method for producing figure-flattering garments and garment designs that create an optical illusion of an anatomical feature, and, in particular, that emphasize and/or deemphasize particular features of the anatomy of the garment's wearer.

BRIEF DESCRIPTION OF THE DISCLOSURE

The present disclosure is generally directed to methods for producing garments and garment designs. More particularly, disclosed are methods for producing figure-flattering garments and garment designs that create an optical illusion of an anatomical feature. The garment designs are created by manipulating a macro scale pattern from nature.

In one aspect, the present disclosure is directed to a method for producing a garment design, the method comprising: a. selecting a macro scale pattern from nature; b. superimposing a digital representation of the macro scale pattern over a digital representation of a garment; and c. manipulating the digital representation of the macro scale pattern to produce an optical illusion of an anatomical feature.

In another aspect, the present disclosure is directed to a method for producing a garment design, the method comprising: a. selecting a first macro scale pattern from nature; b. superimposing a digital representation of the first macro scale pattern over a digital representation of a garment; c. identifying figure-flattering elements of the first macro scale pattern; d. determining if the alignment of the superimposed digital representation of the first macro scale pattern should be altered; and e. manipulating the digital representation of the first macro scale pattern to produce an optical illusion of an anatomical feature.

In another aspect, the present disclosure is directed to a method for producing a garment design, the method comprising: a. selecting a first macro scale pattern from nature; b. superimposing a digital representation of the first macro scale pattern over a digital representation of a garment; c. identifying figure-flattering elements of the first macro scale pattern; d. determining if the alignment of the superimposed digital representation of the first macro scale pattern should be altered; e. selecting at least one additional macro scale pattern from nature; f. superimposing a digital representation of the additional macro scale pattern(s) over the digital representation of the garment; g. identifying figure-flattering elements of the additional macro scale pattern(s); h. determining if the alignment of the superimposed digital representation of the additional macro scale pattern(s) should be altered; i. merging the additional macro scale pattern(s) with the first macro scale pattern to create a digital representation of a combined macro scale pattern; and j. manipulating the digital representation of the combined macro scale pattern to produce an optical illusion of an anatomical feature.

In another aspect, the present disclosure is directed to a method for producing a garment, the method comprising: a. producing a garment design according to a method of the present disclosure; b. creating a three-dimensional model of the garment including the garment design; c. transferring the garment design and a pattern of the garment onto a textile; and d. forming the garment from the textile.

Also disclosed are garments and garment designs produced by the methods disclosed herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE DISCLOSURE

The present disclosure is directed to methods for producing garments and garment designs, and more particularly, figure-flattering garments and garment designs that create an optical illusion of an anatomical feature. The garment designs are created by manipulating a digital representation of a macro scale nature pattern to create the optical illusion. The resulting garment design can be applied to various garments including, but not limited to swimwear, dresses, pants, blouses, skirts, undergarments, and/or outerwear. In particular, when the garment design is applied to a garment, the optical illusion depicted by the garment design enhances some anatomical features and/or deemphasizes less desirable anatomical features of the garment's wearer. As the methods described herein generate designs that may emphasize curvature and contouring, and deemphasize certain features of a wearer's anatomy, these methods may have additional appeal for use in generating designs for plus size garments.

More particularly, the garments and garment designs described herein are inspired by macro scale patterns, such as those found in nature (e.g., patterns found in the non-man made world, such as on animals, plants, naturally formed geographic features, and the like). For instance, exemplary patterns may be based off of patterns found in sea life, botanical life (e.g., plants, trees, tree bark, etc.), birds, amphibians, reptiles, insects, geographic features (e.g., patterns in sedimentary strata in rocks or sand, patterns on sand dunes, patterns on desert floors, patterns on lake beds, etc.), and other non-living objects from the non-man made world (e.g., fossils, sea shells, etc.) and combinations thereof. In some embodiments, the macro scale patterns may be based on patterns found on endangered species.

As described herein, the macro scale nature patterns are altered or manipulated to create figure-flattering garment designs and an optical illusion of an anatomical feature. The patterns may be manipulated by a variety of different techniques including, but not limited to, colorizing, stretching, warping, digital photographic effects, strategic placement, scaling, and combinations thereof. When applied to a garment, the manipulated patterns define contours, camouflage and/or enhance the anatomy of the garment's wearer. That is, by rotating, warping, colorizing, burning, dodging, scaling, etc., and/or arranging the macro scale nature pattern, a garment and garment design can be created that selectively emphasizes and/or deemphasizes features of the anatomy of a wearer.

Figure 1:
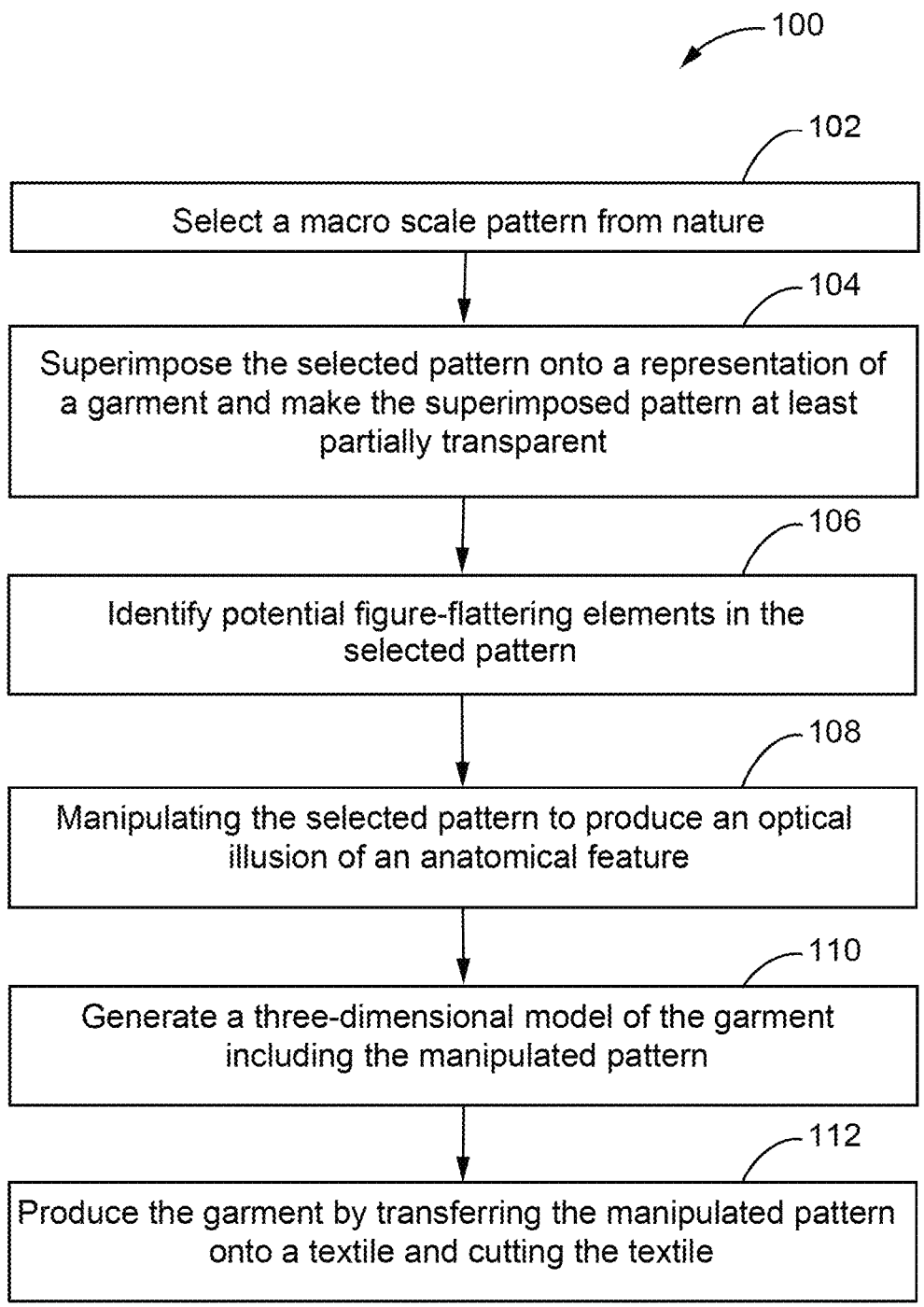
FIG. 1 is a flow chart of an exemplary garment design method.

FIG. 1 is a flow chart of an exemplary garment design method 100. At block 102, a macro scale nature pattern is selected. The phrases "a macro scale nature pattern" or "a macro scale pattern from nature," used herein interchangeably, refer to a pattern that occurs in nature (e.g., on animal life, botanical life, geographical features, etc.) and that is visible to the naked eye. As used herein, the term "pattern" refers to any combination of lines, curves, shapes, etc., and may or may not be a repeating pattern. Although the patterns used in the methods of the present disclosure are taken from nature (e.g., may be from an animal, a plant, a tree, and/or a geographical feature), as used herein, a "pattern" is not intended to refer to merely an image of an object from nature (such as an animal or a plant), but may, however, be some combination of lines, curves, shapes, etc. that is present on the object from nature. It should be understood that the pattern may or may not be visible to the naked eye, as it occurs in nature, but is visible to the naked eye when viewed on a macro scale.

Once the macro scale nature pattern is selected, an image of the macro scale nature pattern is obtained. As used herein, the term "image" is meant to refer to an optical reproduction or other visual representation of the pattern that is produced by an optical device or an electronic device (e.g., a camera), or rendered by drawing or painting by a person or by a computer (e.g., digitally created pattern). The image may be, for example, an image from animals, plants, geographic features, or other non-man-made objects including, but not limited to sea life, botanical life, birds, amphibians, reptiles, insects, geographic features, fossils, sea shells, tree bark, and combinations thereof. In embodiments, the image of the macro scale nature pattern may be selected from the group consisting of a photograph, a painting, a drawing, a digitally created image, and combinations thereof. In some embodiments, the image is a combination of a photograph and a painting. For instance, a photograph of a macro scale nature pattern may be altered by physically painting the photograph to create the image and/or a digital representation of a photograph and a digital representation of the painting may be combined to create the image. In other exemplary embodiments, the image may be a combination of a photograph and a digitally created image. For example, a digital representation of a photograph and a computer generated image may be combined to create a single image of the macro scale nature pattern.

Figure 3:
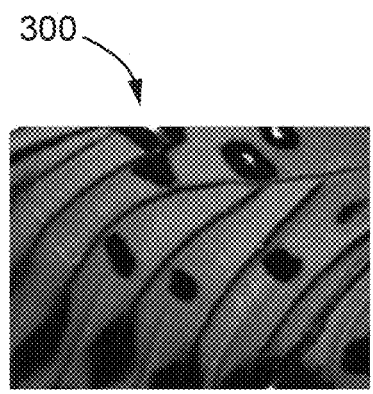
FIG. 3 is a macro scale pattern from a butterfly wing before any digital manipulation is performed.

In one particular embodiment, the image is a photograph. Optionally, the photograph is a digital photograph. In some embodiments, the photograph is a macro photograph. As used herein, the term "macro photograph" refers to a photograph taken using a macro setting or macro lens on a photography device (e.g., a camera) to bring into focus objects that are relatively close to the camera. For example, FIG. 3 is an image of a macro scale nature pattern 300 from a butterfly. Additional images of macro scale nature patterns are depicted in FIG. 11, FIG. 14, FIG. 17, FIG. 19, FIG. 21, FIG. 23, FIG. 25, and FIG. 27. Although a number of examples of macro scale nature patterns from macro photographs are described herein, the disclosure is not limited to or by those examples.

Figure 2:
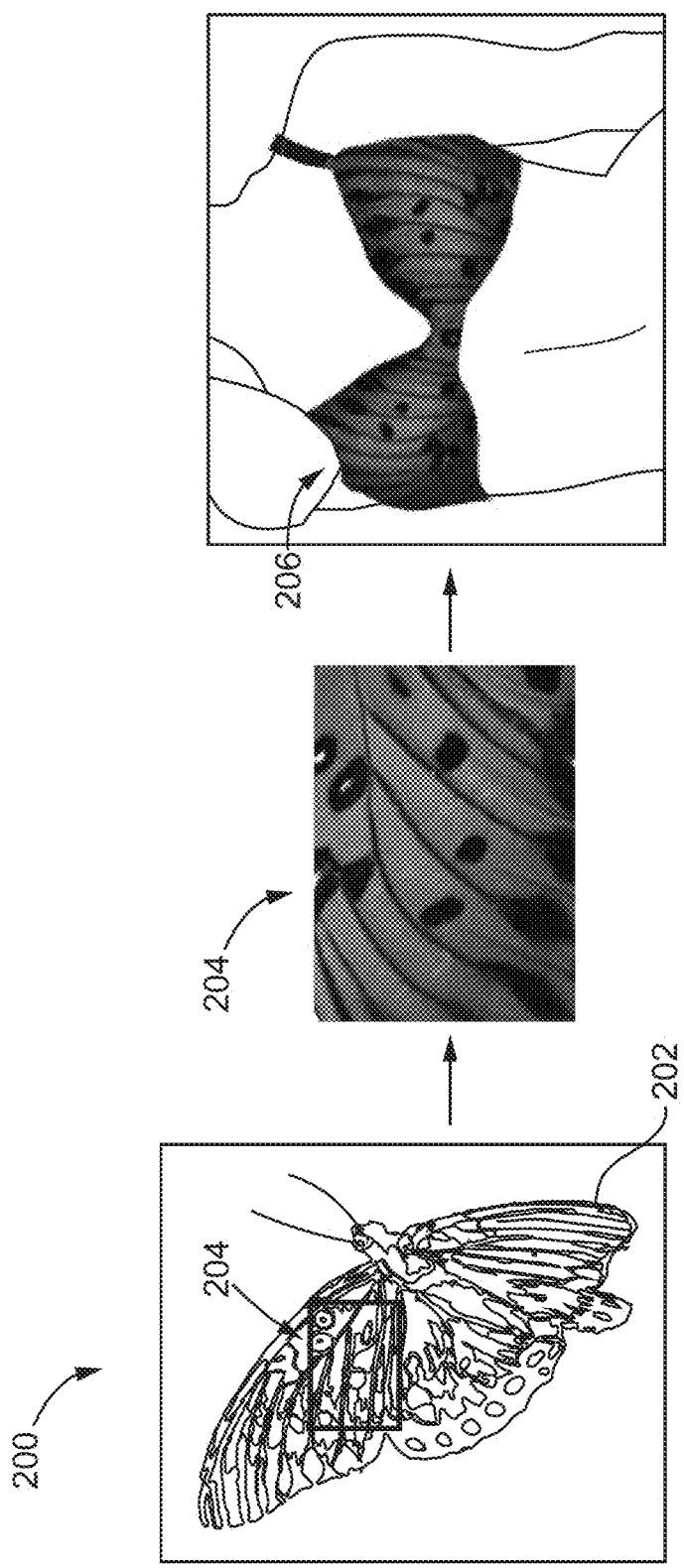
FIG. 2 is a flow chart illustrating an exemplary garment design method.

In some embodiments, the image of the macro scale nature pattern may part of a larger image of or from nature (e.g., an image of a plant, animal, insect, etc.). In such embodiments, the larger image may itself be used as the image of the macro scale pattern. Alternatively, a portion of the larger image may be extracted to obtain an image of the macro scale nature pattern that is used in the methods of the present disclosure. This is illustrated in FIG. 2, which is a flow chart of a representative garment design method of the present disclosure. As can be seen in FIG. 2, an image 200 of an object from nature 202 (in this instance a butterfly) is obtained. An image of a macro scale pattern 204 is extracted from image 200 for use in the creation of garment 206. The image of macro scale pattern 204 may be extracted from image 200 using any suitable technique, such as cutting or cropping image 200.

Once an image of a macro scale nature pattern is selected, in some embodiments, it may need to be transferred to a computing device prior to further manipulation. For instance, if the selected image is a digital photograph on a digital camera, this may be done by directly transferring the digital photograph from the camera to a computer. If the selected image is not already in a digital form (e.g., is a drawing, painting, or non-digital photograph), the method will further comprise converting the image into a digital form to obtain a digital representation of the macro scale pattern. This may be done using any suitable means known in the art (e.g., scanning a hardcopy of a photograph, painting, or drawing into a computer). It should be understood that the digital representation of the macro scale nature pattern used to create the garment design may depict only the macro scale nature pattern, or alternately, may depict a larger image, a portion of which is the macro scale nature pattern. For example, as discussed above, and as depicted in FIG. 2, an image may be cropped in order to extract a selected portion of the image for use as the macro scale nature pattern. In some embodiments, the image of the macro scale nature pattern may be manipulated (e.g., painted and/or cropped) before the digital representation of the macro scale nature pattern is created. For example, as discussed herein, a photograph of a macro scale nature pattern may be altered by physically painting and/or cutting or cropping the photograph prior to creation of the digital representation of the macro scale nature pattern.

Referring back to FIG. 1, at block 104, a digital representation of the macro scale pattern is superimposed over a digital representation of at least a portion of a selected garment (also referred to herein as a "garment template"). Non-limiting examples of suitable garments include swimwear, a dress, pants, a blouse, a skirt, an undergarment, outerwear, and/or any other suitable type of garment. The representation of the garment may be, for example, a photograph of the garment, a garment pattern (e.g., an outline of the shape of the garment), or an image of a garment pattern. In some embodiments, the representation of the garment may be a computer generated garment template.

Figure 4:
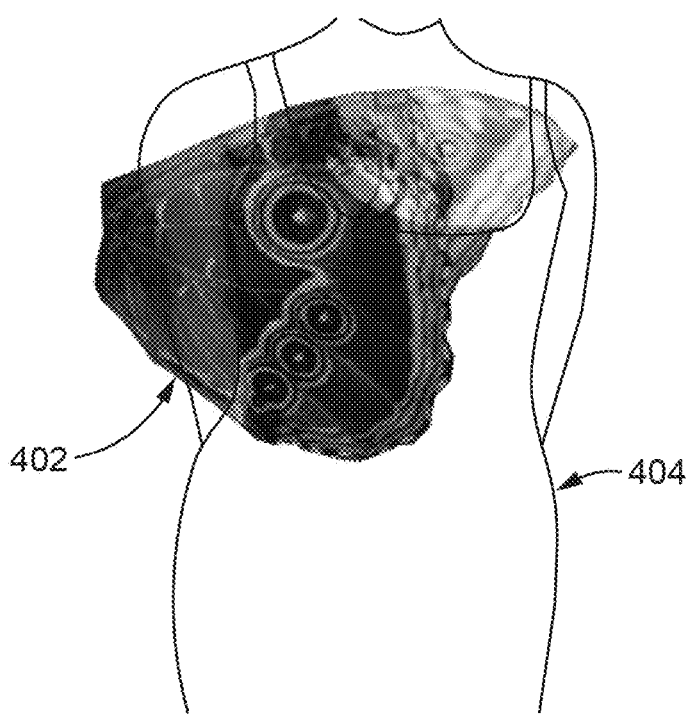
FIG. 4 shows a macro scale pattern superimposed on a representation of a dress.
Figure 5:
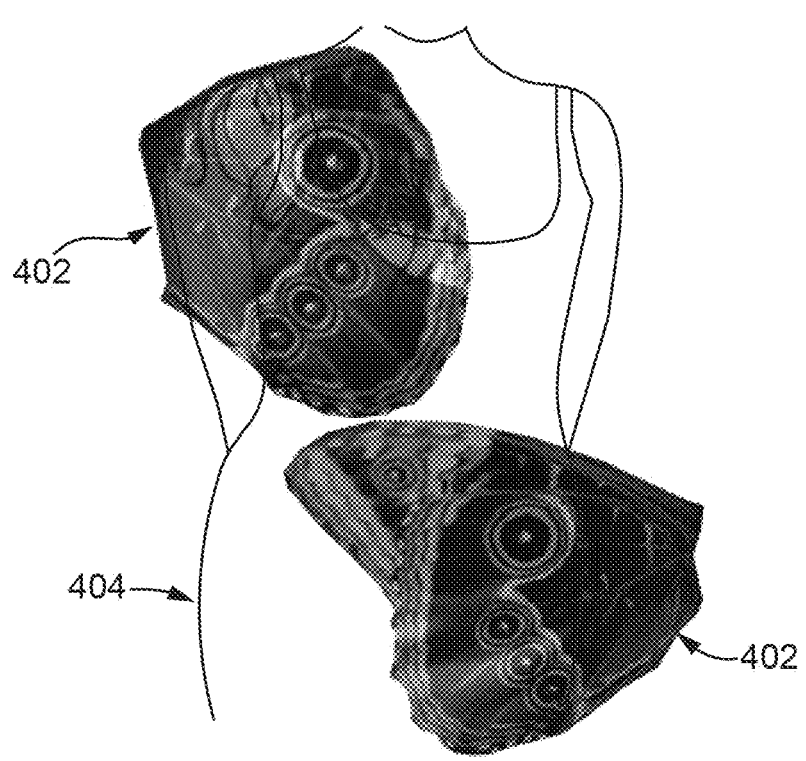
FIG. 5 shows multiple macro scale patterns superimposed on a representation of a dress.

To facilitate positioning of the macro scale pattern, the digital representation of the macro scale pattern may be rendered at least partially transparent. By "at least partially transparent" it is meant that at least a portion of the digital representation of the macro scale pattern is transparent, so that both the macro scale pattern and the representation of the garment are visible when the macro scale pattern is superimposed over the representation of the garment. This is illustrated in FIG. 4. In particular, FIG. 4 shows a macro scale pattern 402 made transparent and superimposed on a representation 404 of a dress. Notably, multiple representations of the same pattern or two or more different patterns may be superimposed on a representation of the same garment. For example, FIG. 5 shows two instances of pattern 402 superimposed on representation 404. It should be understood that all or a portion of the digital representation of the macro scale pattern can be superimposed over the entirety of the digital representation of the garment, or alternately, can be superimposed over a portion of the digital representation of the garment, such as is illustrated in FIGS. 4 and 5.

Referring back to FIG. 1, at block 106, the method may further comprise identifying of one or more potential figure-flattering element of the macro scale pattern. As used herein, "a figure-flattering element" refers to an element of the macro scale pattern that may be used to either enhance or deemphasize an anatomical feature. Such elements may include lines, shapes, patterns, or combinations thereof that are present in the macro scale pattern. For example, the macro scale pattern 1102 depicted in FIG. 11 contains several sections of potentially figure-flattering lines, including a section of generally vertical lines 1106 (which may be aligned to create an illusion of length/height) and a section of generally horizontal curved lines 1104 (which may be aligned to create an illusion of volume); the macro scale pattern 1402 depicted in FIG. 14 contains generally vertical squiggly lines 1404 (which may be aligned to create an illusion of length/height); and the macro scale pattern 1702 depicted in FIG. 17 contains a red colored curved shape 1704 (which may be aligned to create an illusion of curves or volume).

Once the potential figure-flattering elements of the macro scale pattern are identified, a determination is made whether or not the alignment of the superimposed digital representation of the macro scale pattern should be altered. In some embodiments, the alignment of the superimposed digital representation of the macro scale pattern is optionally altered by rotating the macro scale pattern and/or by adjusting the scale the macro scale pattern before further manipulating the macro scale pattern to produce the optical illusion (see block 108).

Figure 12:
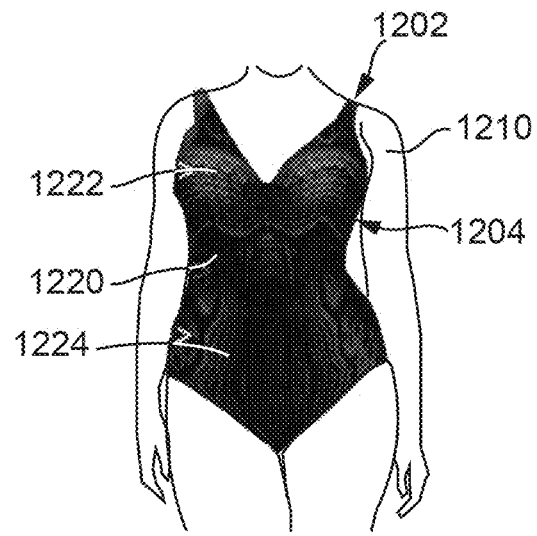
FIG. 12 shows a garment with a design formed by manipulating a digital representation of the pattern shown in FIG. 11.
Figure 13:
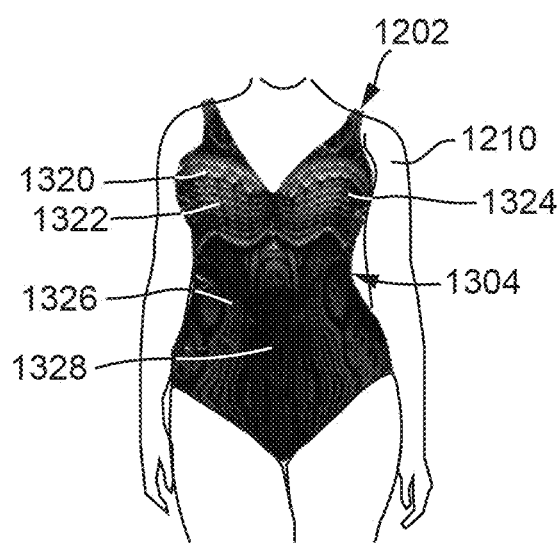
FIG. 13 shows a garment with a design formed by manipulating a digital representation of the pattern shown in FIG. 11.
Figure 14:
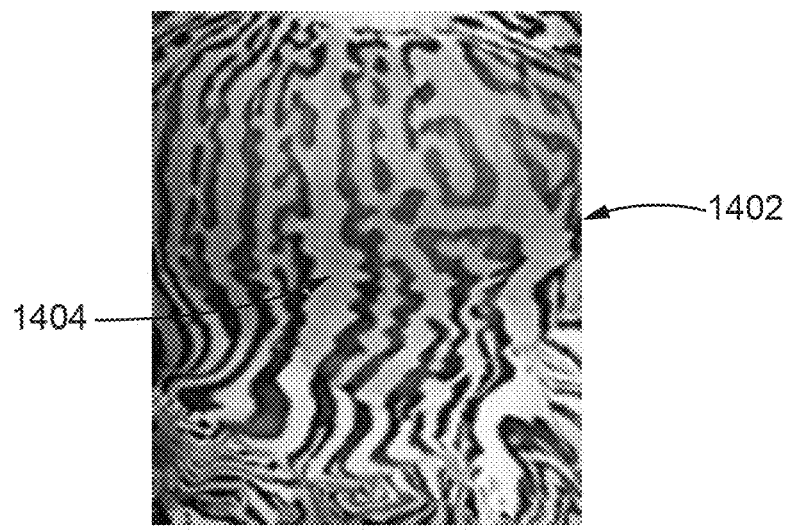
FIG. 14 is a macro scale nature pattern from a sea anemone before any digital manipulation is performed.
Figure 15:
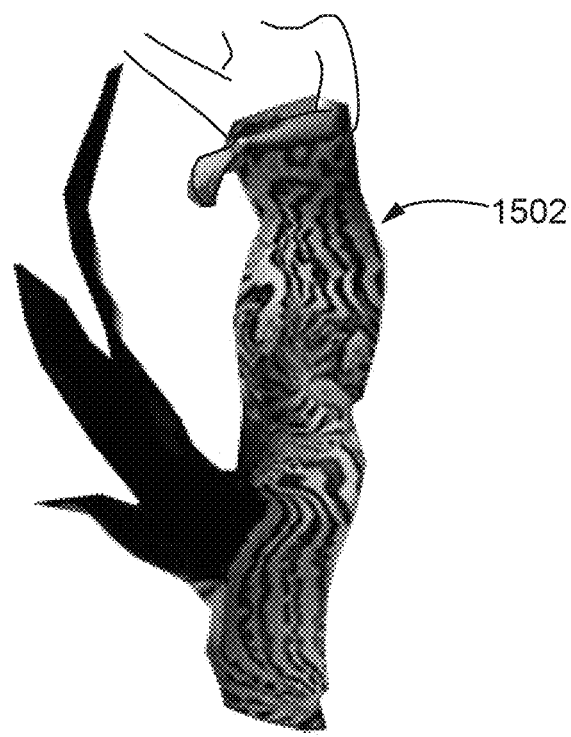
FIG. 15 shows a garment with a design formed by manipulating a digital representation of the pattern shown in FIG. 14.
Figure 16:
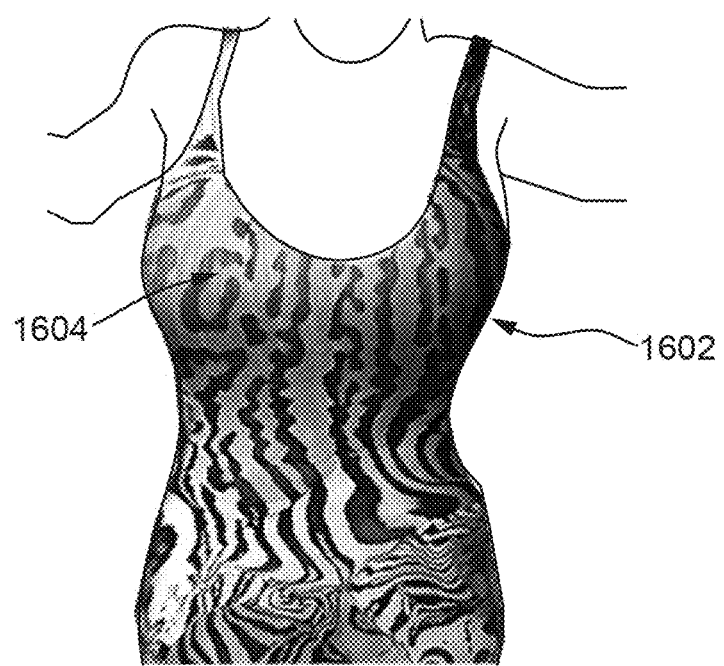
FIG. 16 shows a garment with a design formed by manipulating a digital representation of the pattern shown in FIG. 14.
Figure 17:
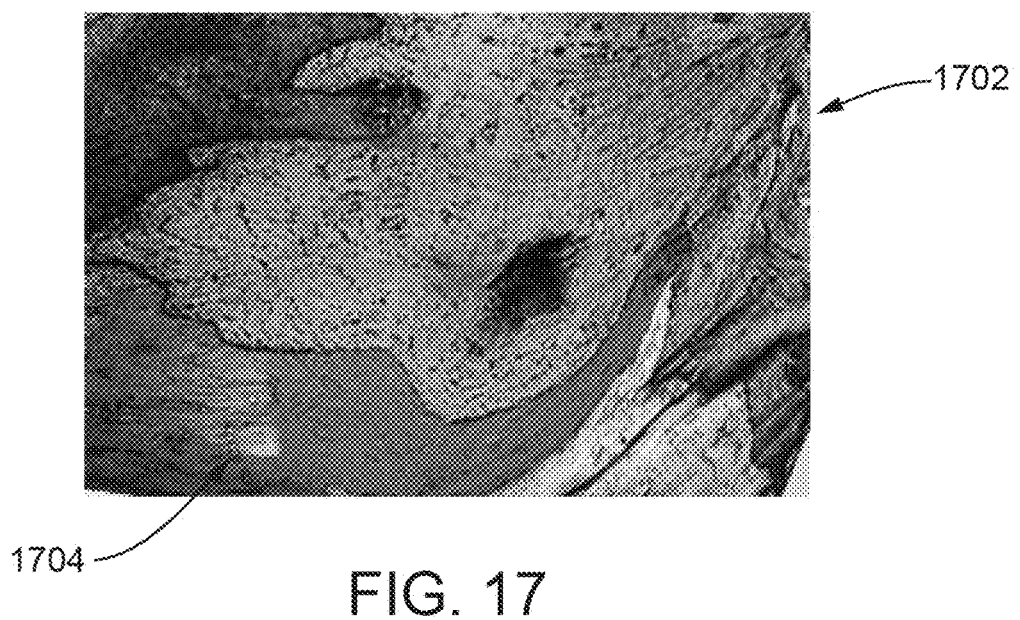
FIG. 17 is a macro scale nature pattern from snow gum tree bark before any digital manipulation is performed.
Figure 18:
FIG. 18 shows a garment with a design formed by manipulating a digital representation of the pattern shown in FIG. 17.

This step is illustrated in the Figures. For example, FIGS. 12 and 13 depict garments where the alignment of the macro scale pattern 1102 depicted in FIG. 11 has been altered so that the section of generally horizontal curved lines 1104 is aligned over the chest region of the garment, and the section of generally vertical lines 1106 is aligned over the lower torso region of the garment. FIGS. 15 and 16 depict garments where the alignment of macro scale pattern 1402 depicted in FIG. 14 has been altered so that the generally vertical squiggly lines 1404 are aligned over the upper torso region of the garments. In the garment depicted in FIG. 16, the alignment of macro scale pattern 1402 depicted in FIG. 14 has also been altered by adjusting the scale of the macro scale pattern in the chest region. FIG. 18 depicts a garment where the alignment of macro scale pattern 1702 depicted in FIG. 17 has been altered, so that the red colored curved shape 1704 is aligned over the chest region of the garment.

Figure 28:
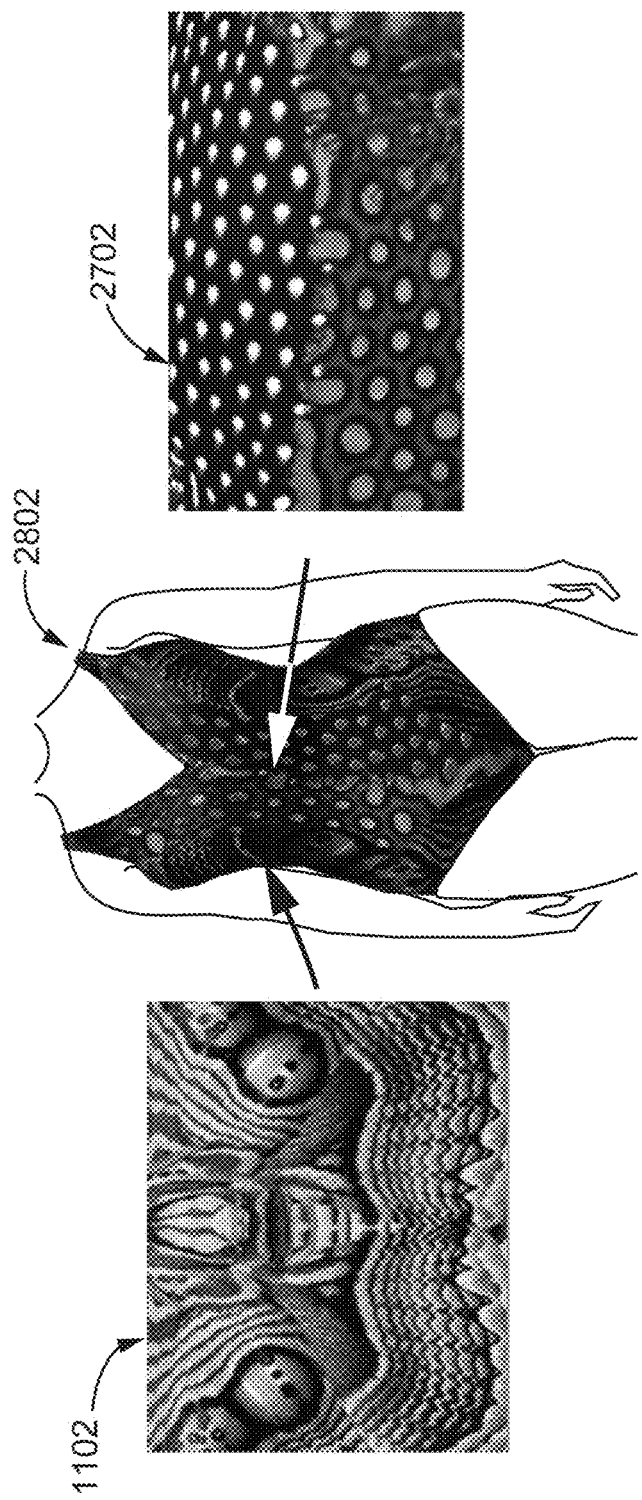
FIG. 28 shows a garment with a design formed by manipulating digital representations of two separate macro scale patterns.

As discussed herein, in some embodiments, multiple representations of the same macro scale nature pattern and/or representations of two or more different macro scale nature patterns may used to produce a single garment design. In embodiments where multiple macro scale nature patterns are used, the steps described in blocks 102, 104, and 106 of FIG. 1 may be repeated for each additional macro scale nature pattern that is used. Once properly aligned, the digital representations of the macro scale nature patterns may optionally be merged to create a combined macro scale pattern, which may be further manipulated to create the optical illusion (see block 108). A design created using multiple macro scale patterns is illustrated in FIG. 28, which shows a garment 2802, which was produced by combining and manipulating digital representations of a macro scale pattern from a moth 1102 and a macro scale pattern from a box fish 2702.

At block 108 of FIG. 1, the digital representation of the macro scale nature pattern is manipulated to produce an optical illusion of an anatomical feature. The digital representation of the macro scale pattern may be manipulated using a variety of techniques, including, but not limited to, rotating the macro scale pattern or a portion thereof; wrapping the macro scale pattern or a portion thereof around the representation of the garment or a portion of the garment; stretching (i.e., elongating) the macro scale pattern or a portion thereof; warping the macro scale pattern or a portion thereof; altering the color (e.g., colorizing) of the macro scale pattern or a portion thereof (e.g., by applying warmer colors to increase perceived volume and/or applying cooler colors to decrease perceived volume); burning (i.e., selectively darkening) the macro scale pattern or a portion thereof; dodging (i.e., selectively brightening) the macro scale pattern or a portion thereof; removing a portion of the macro scale pattern; adding to a portion of the macro scale pattern; fading portions of the macro scale pattern; squeezing the macro scale pattern or a portion thereof; altering the brightness of the macro scale pattern or a portion thereof; adjusting the scale of the macro scale pattern or a portion thereof; and combinations thereof.

As discussed herein, the digital representation of the macro scale nature pattern is manipulated to produce an optical illusion of an anatomical feature. The term "optical illusion" generally refers to visually perceivable objects and images that differ from objective reality. The optical illusions created by the garment designs of the present disclosure are illusions pertaining to the anatomy (e.g., shape or form) of a wearer of a garment having the manipulated macro scale nature pattern thereon. In particular, the optical illusion causes a viewer to perceive some feature of the anatomy of the wearer in a different manner than would be the case in the absence of the manipulated pattern.

Examples of optical illusions that may be created by manipulating the macro scale nature pattern include, but are not limited to, a contouring effect (e.g., creation of an illusion of curves), an effect that causes the viewer to perceive an increased size (e.g., a volumizing effect for enhancing certain anatomical features), an effect that causes the viewer to perceive a decreased size (e.g., a camouflaging effect for deemphasizing certain anatomical features), a slimming effect, a narrowing effect, and/or a lengthening effect (e.g., to create the illusion of height). These effects may be applied to certain aspects of the garment design in order to enhance and/or deemphasize certain features of the wearer's anatomy. Non-limiting examples of anatomical features, the perception of which may be altered by the optical illusions, include hips, waist, chest, height, torso, buttocks, thighs, back (including back fat), and combinations thereof. As used herein, the term "torso" refers to the trunk of the body (front and back), excluding the head and limbs, but including the buttocks. It may be desirable to deemphasize or camouflage anatomical features such as the lower torso (including hips, waist, lower abdomen/tummy, buttocks, back) and thighs. In certain instances, it may be desirable to enhance or emphasize anatomical features such as hips, waist, chest, height, and buttocks, among others.

The optical illusions may be achieved by manipulating the digital representation of the macro scale nature pattern using one or a combination of techniques. For example, in some embodiments, portions of the pattern may be stretched (i.e., elongated) to create the illusion of length or height, and to draw the eye of a viewer upward. This effect may have particular application, for example, to the portion of the pattern that will cover the torso of the garment's wearer, in order to create the illusion of height, and to draw the viewer's eye away from features of the anatomy that it may be desirable to camouflage, such as the abdomen/tummy region, thighs, hips, and/or buttocks.

In some embodiments, the color of one or more portion of the digital representation of the macro scale pattern may be altered to either emphasize or deemphasize certain features of the anatomy. For instance, warmer color hues (e.g., yellows, reds, oranges, browns, etc.) may be used to create the illusion of volume, while cooler color hues (e.g., blues, greens, purples, etc.) may be used to decrease the perception of volume. For example, the portion of the pattern that will cover the chest of the wearer may be colored with warm color hues, in order to create the illusion of voluptuousness, while the portion of the pattern that will cover the lower torso and/or thighs of the wearer may be colored with cooler hues, in order to decrease (deemphasize) the perception of the size of the wearer's waist, abdomen/tummy, hips, back fat, and/or thighs.

In some embodiments, the brightness of one or more portion of the digital representation of the macro scale pattern may be altered to either emphasize or deemphasize certain features of the anatomy. In particular, portions of the macro scale pattern may be selectively darkened (e.g., using techniques such as burning, etc.) and/or darker colors applied. This technique may have particular application, for example, when applied to portions of the pattern that will cover features of the wearer's anatomy that it may be desirable to camouflage and/or deemphasize, such as the lower torso (e.g., waist, abdomen/tummy region, hips, back fat, and/or buttocks) and/or thighs. This technique may also be used to create the illusion of volume. For example, portions of the pattern that will cover the side of and/or will be under the breasts of the wearer may be darkened to create simultaneously a slimming and volumizing illusion. Portions of the macro scale pattern may also be selectively brightened (e.g., using techniques such as dodging) and/or lighter colors applied. This technique may have particular application, for example, when applied to portions of the pattern that will cover features of the wearer's anatomy that it may be desirable to emphasize and/or where it is desirable to create the illusion of volume, such as the wearer's chest, hips, and/or buttocks.

In some embodiments, portions of the macro scale pattern may be warped (e.g., bent, twisted, curved, etc.) to create the illusion of curves. For instance, portions of the pattern may be warped to create horizontal upward curved lines, in order to create the illusion of height and volume. This technique may have particular application, for example, when applied to portions of the pattern that will cover features of the wearer's anatomy that it may be desirable to emphasize and/or where it is desirable to create the illusion of volume, such as the wearer's chest, hips, and/or buttocks.

In some embodiments, portions of the macro scale pattern may be squeezed (i.e., brought closer together or narrowed), to create a narrowing illusion. This technique may have particular application, for example, when applied to portions of the pattern that will cover features of the wearer's anatomy that it may be desirable to minimize or create a narrowing illusion, such as the wearer's waist.

In some embodiments, the scale of portions of the macro scale pattern may be adjusted to create either the illusion of volume, or a minimizing/narrowing illusion. For example, a portion of a pattern may be scaled up (i.e., enlarged) to give the illusion of volume. This technique may have particular application, for example, when applied to portions of the pattern that will cover features of the wearer's anatomy that it may be desirable to emphasize and/or where it is desirable to create the illusion of volume, such as the wearer's chest, hips, and/or buttocks. Portions of the pattern may also be scaled down (i.e., minimized to give a minimizing/narrowing illusion. This technique may have particular application, for example, when applied to portions of the pattern that will cover features of the wearer's anatomy that it may be desirable to minimize, such as the wearer's waist, buttocks, hips, back fat, and/or thighs.

It should be understood that multiple optical illusions may be created by the same garment design, and that any combination of the techniques described herein may be used to create the garments and garment designs of the present disclosure. Although described herein as occurring after the digital representation of the macro scale pattern is superimposed over the representation of the garment, it should be understood that the manipulation of the digital representation of the macro scale pattern may alternately or additionally occur prior to superimposing over the representation of the garment.

In some embodiments, additional manipulation of the macro scale pattern (e.g., digitally adding to the pattern or cropping the pattern) is performed before superimposing the digital representation of the macro scale pattern on the representation of the garment.

Figure 6:
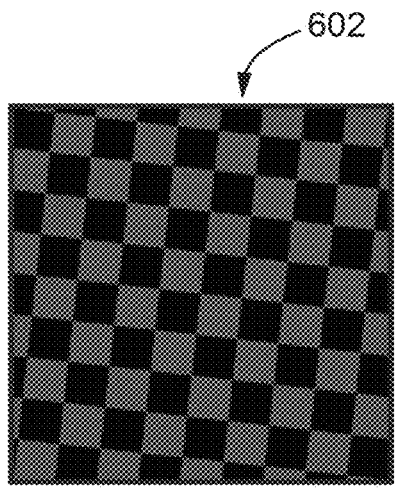
FIG. 6 shows a pattern before any manipulation of the pattern is performed.
Figure 7:
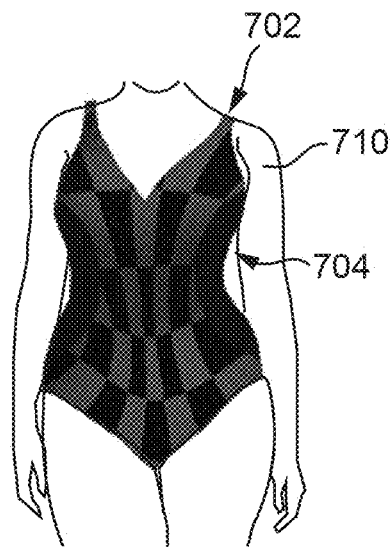
FIG. 7 shows a garment with a design formed by manipulating a digital representation of the pattern shown in FIG. 6.
Figure 8:
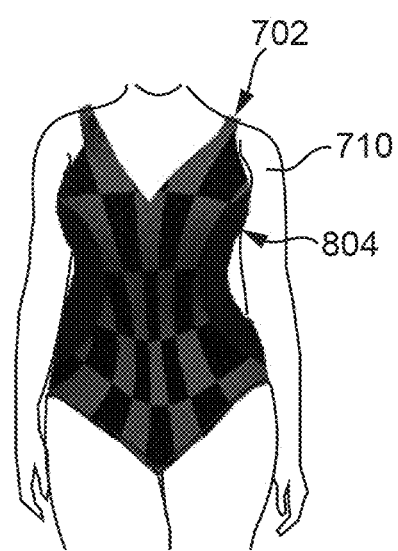
FIG. 8 shows a garment with a design formed by manipulating a digital representation of the pattern shown in FIG. 6.

Non-limiting examples of garments and garment designs produced by the methods of the present disclosure are set forth in the Figures. For example, FIG. 6 shows a pattern 602 before any digital manipulation is performed. FIGS. 7 and 8 show examples of a garment 702 with patterns 704 and 804 formed by digitally manipulating pattern 602 (e.g., by rotating, colorizing, burning, squeezing, and/or dodging pattern 602). Notably, manipulated patterns 704 and 804 create an optical illusion of curves, voluptuousness, and a narrow waist when garment 702 is worn by a wearer 710.

Figure 9:
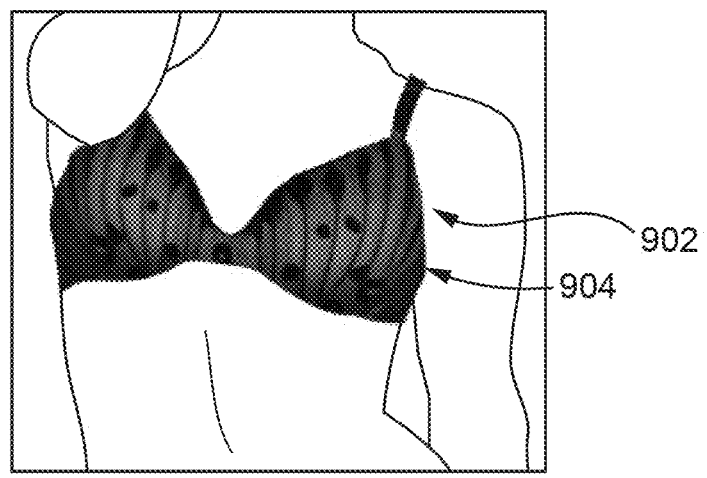
FIG. 9 shows a garment with a design formed by manipulating a digital representation of the pattern shown in FIG. 3.
Figure 10:
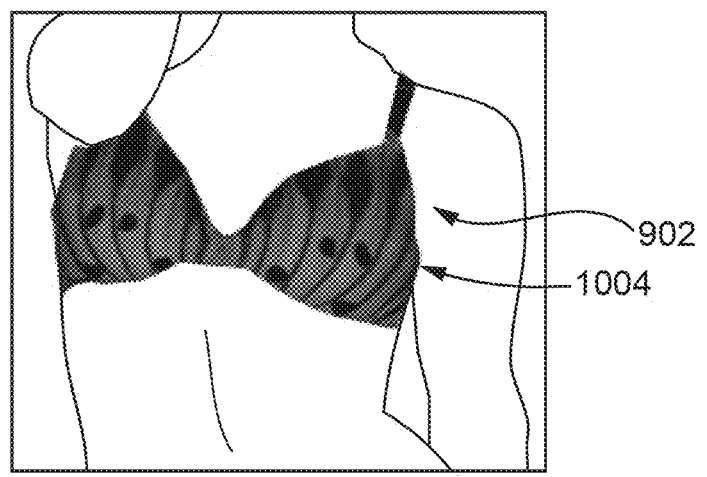
FIG. 10 shows a garment with a design formed by manipulating a digital representation of the pattern shown in FIG. 3.

As another example, FIGS. 9 and 10 show a garment 902 with patterns 904 or 1004 formed by digitally manipulating pattern 300 (shown in FIG. 3). In FIG. 9, pattern 300 has been burned, dodged, and slightly warped to give an optical illusion of curvaceousness. In FIG. 10, pattern 300 has been enlarged (scaled up), rotated, and warped to provide an optical illusion of voluptuousness (volumizing effect).

Figure 11:
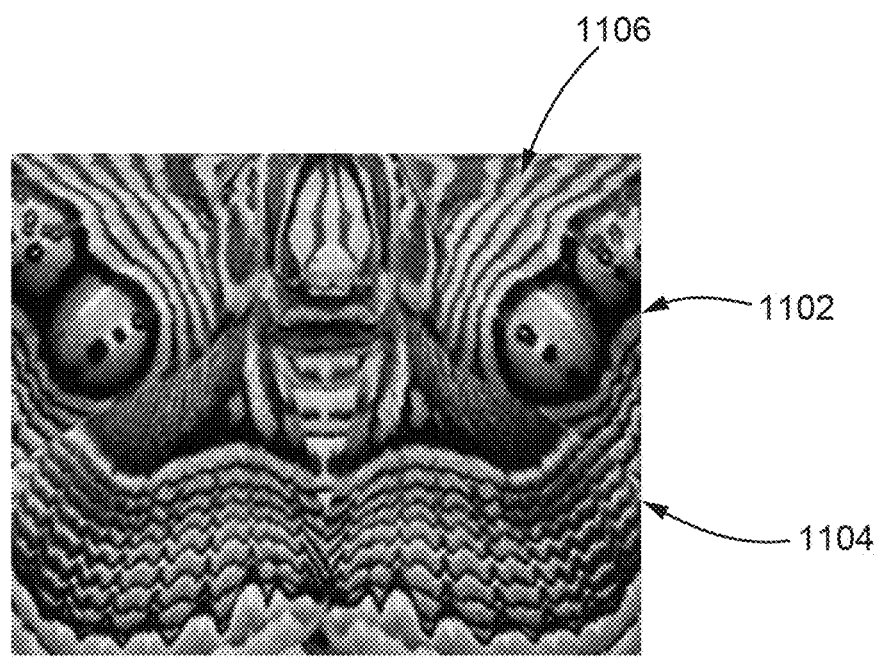
FIG. 11 shows a macro scale nature pattern from a moth before any digital manipulation is performed.

As yet another example, FIG. 11 shows a pattern 1102 before any digital manipulation is performed. FIGS. 12 and 13 show examples of a garment 1202 with patterns 1204 and 1304 formed by digitally manipulating pattern 1102 (e.g., by rotating, warping, colorizing, burning, dodging, elongating, and/or squeezing pattern 1102). Notably, manipulated patterns 1204 and 1304 create an optical illusion of curves, voluptuousness (volumizing effect), height, and a narrow waist when garment 1202 is worn by a wearer 1210.

Specifically, in FIG. 12, pattern 1204 has been darkened in a first region 1220 to decrease the apparent size of the waist of wearer 1210, includes warmer hues in a second region 1222 to increase the apparent size of the breasts of wearer 1210, and includes stretched (elongated) lines in a third region 1224 to create an illusion of length and draw a viewer's eye upward. In FIG. 13, pattern 1304 has lighter colors in a first region 1320 to increase the apparent size of the breasts of wearer 1210, horizontal upward curved lines in a second region 1322 to create an illusion of height and increased volume, darkening in a third region 1324 proximate the sides and bottom of the breasts of wearer 1210 to create a slimming and volumizing illusion, squeezing in a fourth region 1326 to create a narrowing effect at the waist of wearer 1210, and darkening in a fifth region 1328 to decrease the apparent size of a stomach of wearer 1210.

Figure 19:
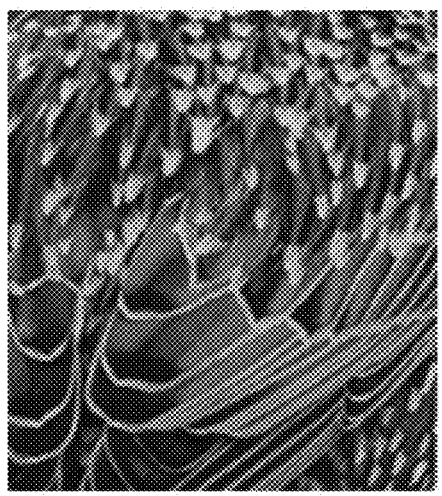
FIG. 19 is a macro scale nature pattern from a European starling before any digital manipulation is performed.
Figure 20:
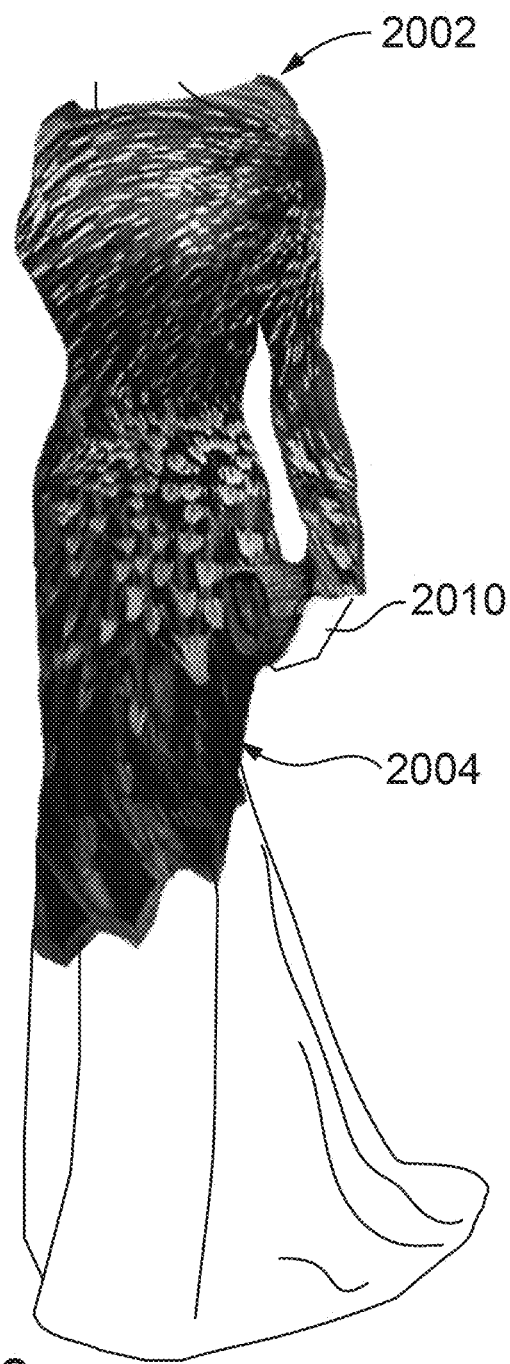
FIG. 20 shows a garment with a design formed by manipulating a digital representation of the pattern shown in FIG. 19.
Figure 21:
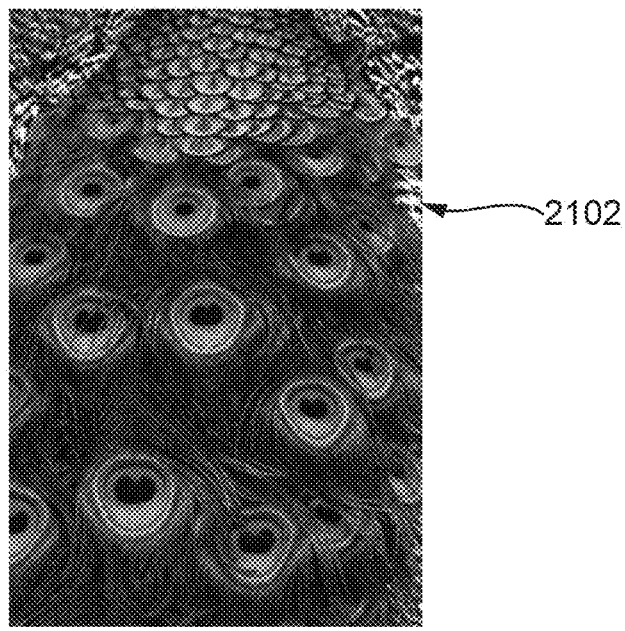
FIG. 21 is a macro scale nature pattern from a peacock before any digital manipulation is performed.
Figure 22:
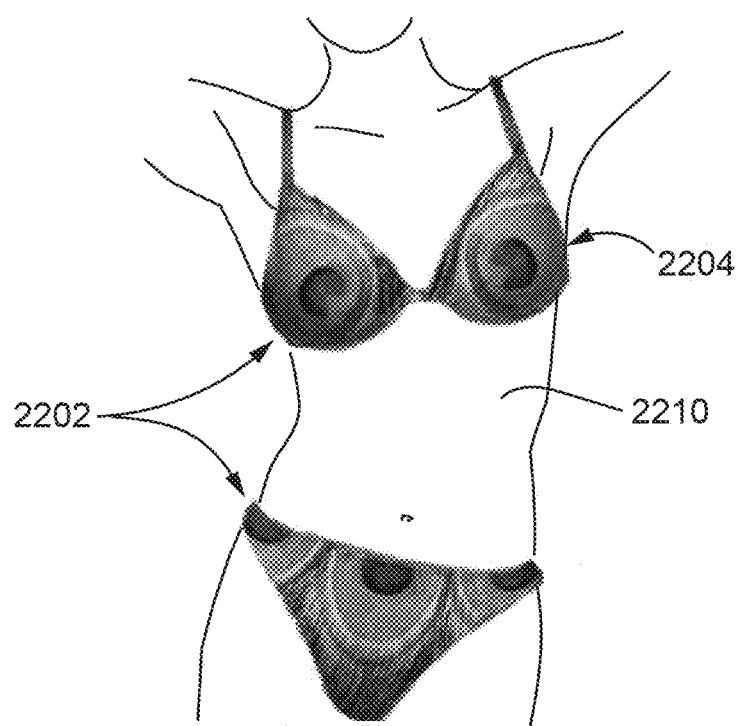
FIG. 22 shows a garment with a design formed by manipulating a digital representation of the pattern shown in FIG. 21.
Figure 23:
FIG. 23 is a macro scale nature pattern from a Costa Rican variable harlequin toad before any digital manipulation is performed.
Figure 24:
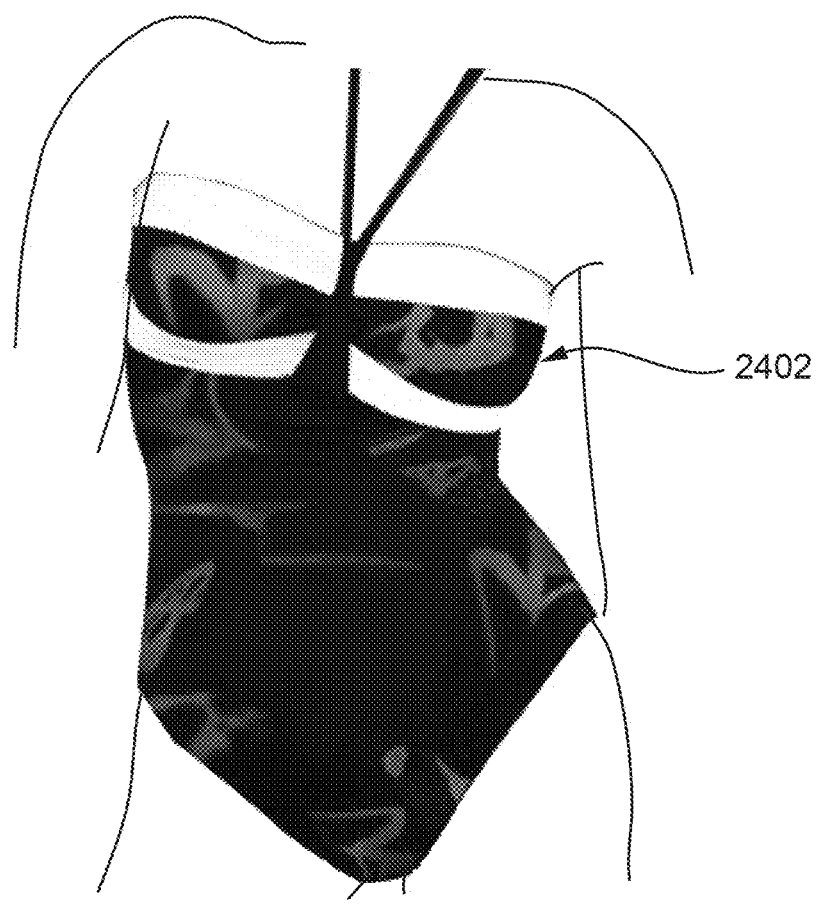
FIG. 24 shows a garment with a design formed by manipulating a digital representation of the pattern shown in FIG. 23.
Figure 25:
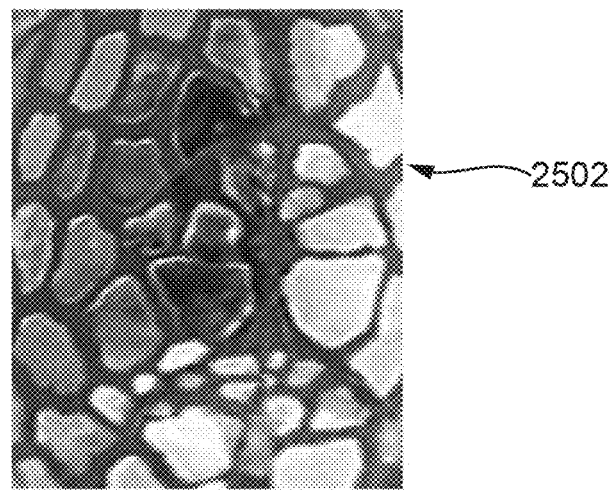
FIG. 25 a macro scale nature pattern from a Singapore spider before any digital manipulation is performed.
Figure 26:
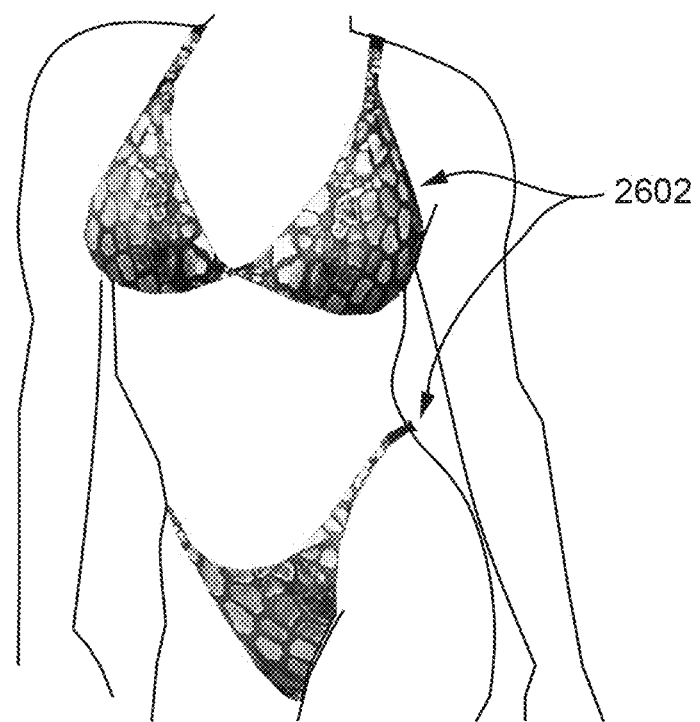
FIG. 26 shows a garment with a design formed by manipulating a digital representation of the pattern shown in FIG. 25.
Figure 27:
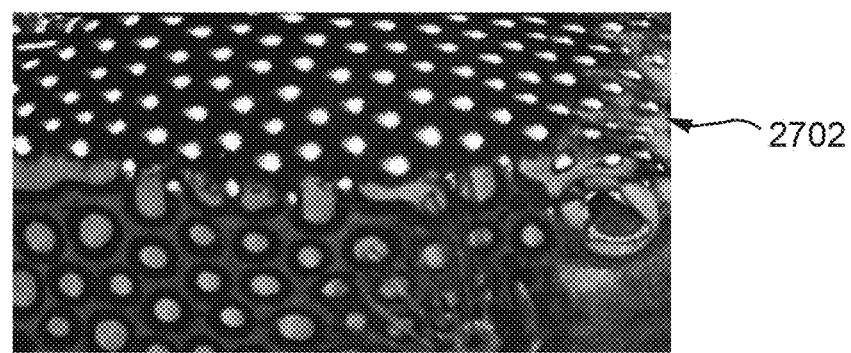
FIG. 27 is a macro scale nature pattern from a box fish before any digital manipulation is performed.

FIGS. 14-28 show additional examples of macro scale patterns and designs and garments produced using these patterns and the methods described herein. For example, FIG. 14 is a macro scale pattern 1402 from a sea anemone, and FIG. 15 shows a garment 1502 produced by digitally manipulating macro scale pattern 1402. FIG. 16 depicts a different garment 1602 produced by digitally manipulating macro scale pattern 1402. As can be seen in FIG. 16, pattern 1402 has been scaled up in a first region 1604 to create an illusion of volume at the wearer's chest region. FIG. 17 is a macro scale pattern 1702 from the bark of the snow gum tree, and FIG. 18 shows a garment 1802 produced by digitally manipulating macro scale pattern 1702 (e.g., by rotating, lengthening, colorizing, etc.). FIG. 19 is a macro scale pattern 1902 from the European starling, and FIG. 20 shows a garment 2002 produced by digitally manipulating macro scale pattern 1902 (e.g., by rotating, squeezing, and/or scaling). As can be seen in FIG. 20, pattern 1902 has been elongated in a first region 2004 to create the illusion of height of wearer 2010. FIG. 21 is a macro scale pattern 2102 from peacock feathers, and FIG. 22 shows a garment 2202 produced by digitally manipulating macro scale pattern 2102. As can be seen from FIG. 22, pattern 2102 has been colorized in a first region 2204 by application of warm hued colors to create the illusion of volume of the chest of the wearer 2210. FIG. 23 is a macro scale pattern 2302 of an endangered Costa Rican harlequin toad, and FIG. 24 shows a garment 2402 produced by digitally manipulating macro scale pattern 2302. As can be seen from FIG. 24, pattern 2302 has been brightened in the chest and hip region to create the illusion of volume and curves, while pattern 2302 has been darkened in the waist and tummy region to deemphasize these anatomical features. FIG. 25 is a macro scale pattern 2502 from a Singapore spider, and FIG. 26 shows a garment 2602 produced by digitally manipulating macro scale pattern 2502. As can be seen from FIG. 26, pattern 2502 has been rotated and darkened at the side and under the breasts of the wearer to create a volumizing illusion. FIG. 27 is a macro scale pattern 2702 from a box fish, and FIG. 28 shows a garment 2802 produced by combining and digitally manipulated macro scale pattern 1102 from a moth and macro scale pattern 2702 from a box fish.

As noted above, representations of multiple macro scale patterns may be superimposed over the representation of the garment and manipulated as desired to create the optical illusion(s). Each macro scale pattern may be individually manipulated, or alternately, the macro scale patterns may be first merged to create a combined macro scale pattern, and the combined macro scale pattern manipulated to create the optical illusion(s). Further, excess portions of the macro scale pattern (i.e., portions lying outside of the garment representation) may be digitally cropped or trimmed out prior to and/or after manipulation to produce the optical illusion(s).

In some embodiments, multiple macro scale patterns may be superimposed over one or more additional macro scale pattern to form one or more layers. Each layer can then be digitally manipulated either independently or in combination to create additional variations in design. It should be understood that each additional macro scale pattern that is superimposed may or may not overlap with other macro scale patterns superimposed over the representation of the garment.

Referring back to FIG. 1, once the digital manipulation of the one or more macro scale patterns is complete, at block 110, a three-dimensional model of the garment, including the garment design (with the manipulated pattern(s)), is generated. At this point, the garment design may also be refined and rendered into a vector format using any suitable technique known in the art. This advantageously allows for scaling of the garment design to different size garments.

Thus, in one aspect, the methods of the present disclosure may further comprise scaling of the garment design (pattern grading). In particular, the scale of the design is either increased (scaled up) or decreased (scaled down), depending on the size of the garment being produced. Scaling of the garment design allows for the design to be applied to different sized garments, so that the optical illusion(s) of the anatomical feature(s) present in the design are undiminished (i.e., are precisely placed in the correct positions) on garments of different size.

At block 112, the actual garment including the garment design is produced by transferring the garment design and a pattern of the garment (e.g., a garment template) onto an appropriate textile, and cutting the textile as needed (e.g., by cutting the textile according to the garment pattern). The garment design and pattern may be transferred sequentially or simultaneously onto the textile. Preferably, the garment design and pattern are simultaneously transferred onto the textile, to ensure the optical illusion(s) of the anatomical feature(s) depicted by the design appear in the correct position in the garment.

Typically, the garment design is transferred to the textile by printing. Optionally, the printing may be digital printing. The textile may be any material suitable for producing garments and that may be printed and/or painted. Preferably, the textile is a fabric. In some embodiments, a particular textile or fabric is chosen to enhance the illusion produced by the garment design.

In certain embodiments, the garment design may be further altered after transfer to the textile. For instance, the garment design may be enhanced by adding paint (e.g., fabric paint), decals, and/or other embellishments to the garment.

Figure 29:
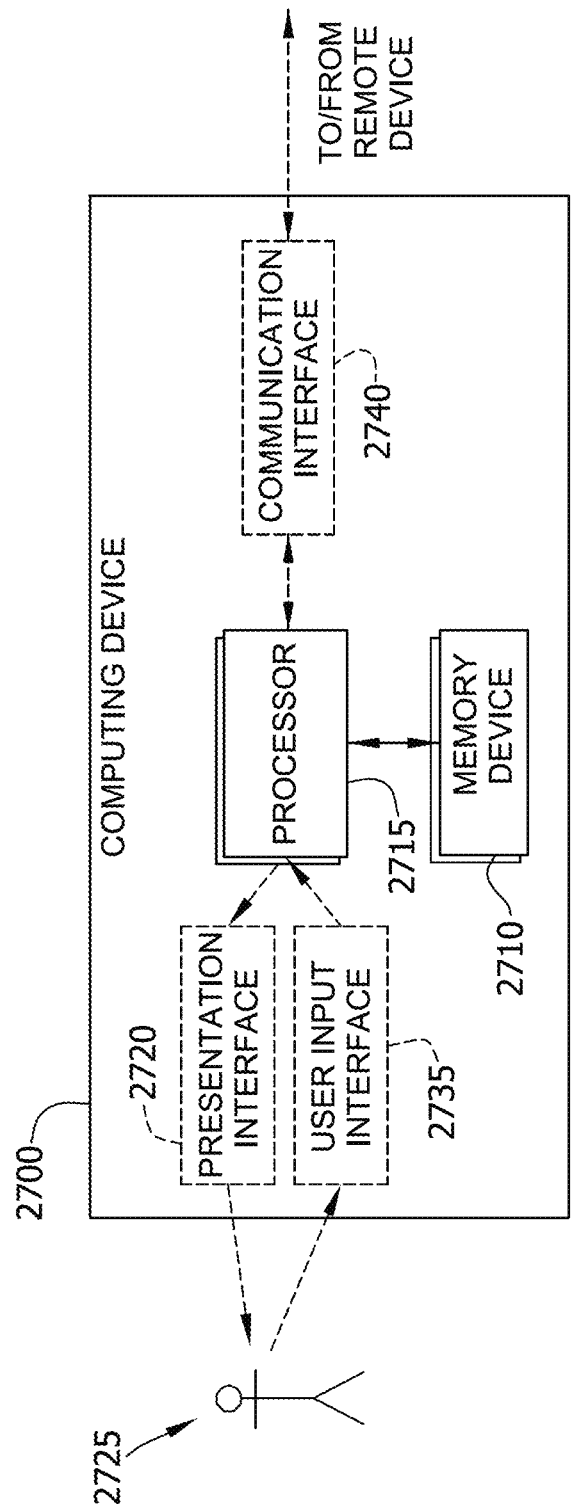
FIG. 29 is a block diagram of a computing device that may be used to implement the design method shown in FIG. 1.

FIG. 29 is a block diagram of an exemplary computing device 2700 that may be used to implement at least some of the steps of method 100 (shown in FIG. 1). Computing device 2700 includes at least one memory device 2710 and a processor 2715 that is coupled to memory device 2710 for executing instructions. In some implementations, executable instructions are stored in memory device 2710. In the exemplary implementation, computing device 2700 performs one or more operations described herein by programming processor 2715. For example, processor 2715 may be programmed by encoding an operation as one or more executable instructions and by providing the executable instructions in memory device 2710.

Processor 2715 may include one or more processing units (e.g., in a multi-core configuration). Further, processor 2715 may be implemented using one or more heterogeneous processor systems in which a main processor is present with secondary processors on a single chip. In another illustrative example, processor 2715 may be a symmetric multi-processor system containing multiple processors of the same type. Further, processor 2715 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein. In the exemplary implementation, processor 2715 executes CILST algorithm, as described herein.

In the exemplary implementation, memory device 2710 is one or more devices that enable information such as executable instructions and/or other data to be stored and retrieved. Memory device 2710 may include one or more computer readable media, such as, without limitation, dynamic random access memory (DRAM), static random access memory (SRAM), a solid state disk, and/or a hard disk. Memory device 2710 may be configured to store, without limitation, application source code, application object code, source code portions of interest, object code portions of interest, configuration data, execution events and/or any other type of data.

In the exemplary implementation, computing device 2700 includes a presentation interface 2720 that is coupled to processor 2715. Presentation interface 2720 presents information to a user 2725. For example, presentation interface 2720 may include a display adapter (not shown) that may be coupled to a display device, such as a cathode ray tube (CRT), a liquid crystal display (LCD), an organic LED (OLED) display, and/or an "electronic ink" display. In some implementations, presentation interface 2720 includes one or more display devices.

In the exemplary implementation, computing device 2700 includes a user input interface 2735. User input interface 2735 is coupled to processor 2715 and receives input from user 2725. User input interface 2735 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of presentation interface 2720 and user input interface 2735.

Computing device 2700, in the exemplary implementation, includes a communication interface 2740 coupled to processor 2715. Communication interface 2740 communicates with one or more remote devices. To communicate with remote devices, communication interface 2740 may include, for example, a wired network adapter, a wireless network adapter, and/or a mobile telecommunications adapter.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for producing a garment design, the method comprising:
   a. selecting a macro scale pattern from nature;
   b. superimposing a digital representation of the macro scale pattern over a digital representation of a garment; and
   c. producing an optical illusion in the macro scale pattern by manipulating the digital representation of the image of the macro scale pattern, wherein the optical illusion is of a shape or form of an anatomical feature, and wherein manipulating the digital representation of the image of the macro scale pattern comprises warping the image of the macro scale pattern or a portion thereof.

2. The method of claim 1, further comprising obtaining an image of the macro scale pattern from nature, wherein the image is selected from the group consisting of a photograph, a painting, a drawing, a digitally created image, and combinations thereof.

3. The method of claim 2, wherein the image is a photograph, and the photograph is a macro photograph.

4. The method of claim 1, further comprising rendering the digital representation of the image of the macro scale pattern transparent.

5. The method of claim 1, wherein the manipulation of the digital representation of the image of the macro scale pattern further comprises a manipulation selected from the group consisting of rotating the image of the macro scale pattern or a portion thereof; wrapping the image of the macro scale pattern or a portion thereof around the digital representation of the garment or a portion of the digital representation of the garment; stretching the image of the macro scale pattern or a portion thereof; altering the color of the image of the macro scale pattern or a portion thereof; burning the image of the macro scale pattern or a portion thereof; dodging the image of the macro scale pattern or a portion thereof; removing a portion of the image of the macro scale pattern; adding to a portion of the image of the macro scale pattern; fading a portion of the image of the macro scale pattern; squeezing the image of the macro scale pattern or a portion thereof; altering the brightness of the image of the macro scale pattern or a portion thereof; adjusting the scale of the image of the macro scale pattern or a portion thereof; and combinations thereof.

6. The method of claim 1, wherein the anatomical feature is selected from the group consisting of hips, waist, chest, height, torso, buttocks, thighs, back, lower abdomen/tummy, and combinations thereof.

7. The method of claim 1, wherein the digital representation of the image of the macro scale pattern is manipulated by stretching the image of the macro scale pattern or a portion thereof to create a lengthening effect; applying warm color hues to the image of the macro scale pattern or a portion thereof to create a volumizing effect; brightening the image of the macro scale pattern or a portion thereof to create a volumizing effect; warping the image of the macro scale pattern or a portion thereof to create a contouring effect; squeezing the image of the macro scale pattern or a portion thereof to create a narrowing effect; scaling up the image of the macro scale pattern or a portion thereof to create a volumizing effect; or combinations thereof.

8. The method of claim 1, wherein the digital representation of the image of the macro scale pattern is manipulated by applying cool color hues to the image of the macro scale pattern or a portion thereof to create a slimming effect or a perceived decrease in size; darkening the image of the macro scale pattern or a portion thereof to create a slimming effect or a perceived decrease in size; squeezing the image of the macro scale pattern or a portion thereof to create a narrowing effect; scaling down the image of the macro scale pattern or a portion thereof to create a narrowing effect or a perceived decrease in size; or combinations thereof.

9. The method of claim 1, wherein the digital representation of the image of the macro scale pattern is a combination of more than one macro scale pattern from nature.

10. The method of claim 1, wherein manipulating the digital representation of the image of the macro scale pattern creates an effect selected from the group consisting of a contouring effect, a volumizing effect, a perceived decrease in size, a slimming effect, a narrowing effect, a lengthening effect, and combinations thereof.

11. The method of claim 1, wherein the image of the macro scale pattern is a macro photograph, and the method further comprises taking the macro photograph.

12. The method of claim 1, wherein the manipulation of the digital representation of the image of the macro scale pattern further comprises a manipulation selected from the group consisting of:

aligning a first portion of the digital representation of the image of the macro scale pattern over a torso region of the digital representation of the garment, and stretching the first portion of the digital representation of the image of the macro scale pattern to create a lengthening effect;

aligning a first portion of the digital representation of the image of the macro scale pattern over a chest region of the digital representation of the garment, and applying warm color hues to the first portion of the digital representation of the image of the macro scale pattern to create a volumizing effect;

aligning a first portion of the digital representation of the image of the macro scale pattern over a lower torso region or a thigh region of the digital representation of the garment, and applying cool color hues to the first portion of the digital representation of the image of the macro scale pattern to create a slimming effect or a perceived decrease in size;

aligning a first portion of the digital representation of the image of the macro scale pattern over a chest region, a hip region, or a buttocks region of the digital representation of the garment, and brightening the first portion of the digital representation of the image of the macro scale pattern to create a volumizing effect;

aligning a first portion of the digital representation of the image of the macro scale pattern over a lower torso region or a thigh region of the digital representation of the garment, and darkening the first portion of the digital representation of the image of the macro scale pattern to create a slimming effect or a perceived decrease in size;

aligning a first portion of the digital representation of the image of the macro scale pattern over a chest region, a hip region, or a buttocks region of the digital representation of the garment, and warping the first portion of the digital representation of the image of the macro scale pattern to create a contouring effect or an illusion of volume;

aligning a first portion of the digital representation of the image of the macro scale pattern over a waist region of the digital representation of the garment, and squeezing the first portion of the digital representation of the image of the macro scale pattern to create a narrowing effect;

aligning a first portion of the digital representation of the image of the macro scale pattern over a chest region, a hip region, or a buttocks region of the digital representation of the garment, and scaling up the first portion of the digital representation of the image of the macro scale pattern to create a volumizing effect; and aligning a first portion of the digital representation of the image of the macro scale pattern over a waist region, a buttocks region, a hip region, a back region, or a thigh region of the digital representation of the garment, and scaling down the first portion of the digital representation of the image of the macro scale pattern to create a narrowing effect or a perceived decrease in size.

13. A method for producing a garment design, the method comprising:
a. selecting a first macro scale pattern from nature;
b. superimposing a digital representation of an image of the first macro scale pattern over a digital representation of at least a portion of a garment;
c. identifying a figure-flattering element in the first macro scale pattern;
d. determining if the alignment of the superimposed digital representation of the image of the first macro scale pattern should be altered based on the figure-flattering element; and
e. manipulating the digital representation of the image of the first macro scale pattern, wherein manipulating the digital representation of the image of the first macro scale pattern comprises warping the image of the first macro scale pattern or a portion thereof.

14. The method of claim 13, further comprising altering the alignment of the superimposed digital representation of the image of the first macro scale pattern.

15. The method of claim 13, further comprising selecting at least one additional macro scale pattern from nature, and superimposing a digital representation of an image of the additional macro scale pattern(s) over the digital representation of the garment, or a portion thereof.

16. A method for producing a garment, the method comprising:
a. producing a manipulated pattern for a garment design, wherein the manipulated pattern for the garment design is produced by a method comprising:
(i) selecting a macro scale pattern from nature,
(ii) superimposing a digital representation of an image of the macro scale pattern over a digital representation of at least a portion of a garment,
(iii) producing an optical illusion in the macro scale pattern by manipulating the digital representation of the image of the macro scale pattern, wherein the optical illusion is of a shape or form of an anatomical feature, and wherein manipulating the digital representation of the image of the macro scale pattern comprises warping the image of the macro scale pattern or a portion thereof;
b. applying the manipulated pattern for the garment design to a three-dimensional model;
c. transferring the manipulated pattern for the garment design and a pattern of the garment onto a textile; and
d. forming the garment from the textile.

17. The method of claim 16, wherein the manipulated pattern for the garment design is scaled to match the size of the garment pattern prior to transferring the garment design onto the textile.

18. The method of claim 16, wherein the manipulated pattern for the garment design and the garment pattern are simultaneously transferred onto the textile.

19. A method for producing a design for a figure-flattering garment, the method comprising:
selecting a macro scale pattern from nature;
obtaining a digital representation of an image of the macro scale pattern; and
producing an optical illusion in the macro scale pattern by manipulating the digital representation of the image of the macro scale pattern, wherein the optical illusion is of a shape or form of an anatomical feature of a wearer of the garment, and wherein manipulating the digital representation of the image of the macro scale pattern comprises warping the image of the macro scale pattern or a portion thereof.

20. The method of claim 19, further comprising superimposing the digital representation of the image of the macro scale pattern or the manipulated digital representation of the image of the macro scale pattern over a digital representation of a garment or a portion thereof.

21. The method of claim 20, wherein manipulating the digital representation of the image of the macro scale pattern further comprises wrapping the digital representation of the image of the macro scale pattern around the digital representation of the garment or a portion thereof.

22. A method for producing a design for a figure-flattering garment, the method comprising:
   selecting a macro scale pattern from nature;
   selecting an anatomical feature of a wearer of the garment;
   superimposing a digital representation of an image of the macro scale pattern over a region of a garment template that covers the anatomical feature of the wearer; wherein the garment template is a digital representation of at least a portion of the garment; and
   producing an optical illusion in the macro scale pattern by manipulating the digital representation of the image of the macro scale pattern; wherein the optical illusion is of a shape or form of the anatomical feature; and wherein manipulating the digital representation of the image of the macro scale pattern comprises warping the image of the macro scale pattern or a portion thereof.

* * * * *